(12) United States Patent
Eckel et al.

(10) Patent No.: US 10,037,460 B2
(45) Date of Patent: *Jul. 31, 2018

(54) SYSTEM AND METHOD FOR CREDENTIAL AUTHENTICATION

(71) Applicant: MorphoTrust USA Inc., Billerica, MA (US)

(72) Inventors: Robert Andrew Eckel, Andover, MA (US); Thiagarajan Saravanan, Billerica, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,535

(22) Filed: Oct. 31, 2016

(65) Prior Publication Data

US 2017/0103260 A1    Apr. 13, 2017

Related U.S. Application Data

(63) Continuation of application No. 14/282,339, filed on May 20, 2014, now Pat. No. 9,481,197.

(Continued)

(51) Int. Cl.
*G06K 9/00* (2006.01)
*G06Q 50/26* (2012.01)
(Continued)

(52) U.S. Cl.
CPC ......... *G06K 9/00483* (2013.01); *B42D 25/23* (2014.10); *B42D 25/24* (2014.10);
(Continued)

(58) Field of Classification Search
CPC ........ G06F 21/32; B42D 25/00; G06T 1/0021
See application file for complete search history.

(56) References Cited

U.S. PATENT DOCUMENTS

| 5,469,506 A | 11/1995 | Berson |
| 5,984,366 A | 11/1999 | Priddy |

(Continued)

FOREIGN PATENT DOCUMENTS

| WO | WO 2001/043026 | 6/2001 |
| WO | WO 2005/038583 | 7/2006 |

OTHER PUBLICATIONS

Exented European Search Report for European Application No. 14807295.2, dated Mar. 17, 2017, 5 pages.

(Continued)

*Primary Examiner* — Sean Conner
*Assistant Examiner* — Pinalben Patel
(74) *Attorney, Agent, or Firm* — Fish & Richardson P.C.

(57) ABSTRACT

Some implementations provide a machine-assisted method for screening a person, the method including: receiving, at a scanning device, an identification document presented by the person, the identification document showing a machine-readable code that encodes personally identifiable information of the person, a biometric of the person, and printed information; scanning the machine-readable code on the identification document to extract personally identifiable information of the person; comparing the extracted personally identifiable information against records stored at a database; determining that the extracted personal identifiable information matches a record stored at the database; receiving data encoding the biometric of the person on the identification document for comparison with the person presenting the identification document; receiving a determination that the biometric from the identification document identifies the person presenting the identification document; and determining whether the identification document is digitally watermarked to identify payload data.

27 Claims, 8 Drawing Sheets

Related U.S. Application Data

(60) Provisional application No. 61/831,374, filed on Jun. 5, 2013.

(51) Int. Cl.
    *G06T 1/00* (2006.01)
    *G06F 21/32* (2013.01)
    *B42D 25/23* (2014.01)
    *B42D 25/24* (2014.01)

(52) U.S. Cl.
    CPC ........... *G06F 21/32* (2013.01); *G06Q 50/265* (2013.01); *G06T 1/0021* (2013.01); *G06K 9/00288* (2013.01)

(56) References Cited

U.S. PATENT DOCUMENTS

| | | | |
|---|---|---|---|
| 6,269,169 B1* | 7/2001 | Funk | G07C 9/00071 283/72 |
| 7,239,734 B2 | 7/2007 | Alattar et al. | |
| 7,363,505 B2 | 4/2008 | Black | |
| 7,561,716 B2 | 7/2009 | Ho et al. | |
| 8,028,896 B2 | 10/2011 | Carter et al. | |
| 8,083,130 B1 | 12/2011 | Cipriano | |
| 8,087,583 B2 | 1/2012 | Hawes | |
| 8,234,172 B2 | 7/2012 | Hagale et al. | |
| 9,129,451 B2 | 9/2015 | Frueh | |
| 9,481,197 B2* | 11/2016 | Eckel | G06F 21/32 |
| 9,830,950 B2* | 11/2017 | Rodriguez | H04N 5/235 |
| 2001/0021979 A1* | 9/2001 | Ito | G06T 1/0021 713/189 |
| 2002/0169963 A1 | 11/2002 | Seder et al. | |
| 2003/0011758 A1* | 1/2003 | Ochiai | G06F 21/32 356/71 |
| 2003/0086591 A1 | 5/2003 | Simon | |
| 2004/0081332 A1* | 4/2004 | Tuttle | G06K 9/00442 382/100 |
| 2004/0104268 A1 | 6/2004 | Bailey | |
| 2004/0158724 A1* | 8/2004 | Carr | B42D 25/00 713/186 |
| 2004/0181671 A1* | 9/2004 | Brundage | B42D 25/333 713/176 |
| 2004/0190757 A1* | 9/2004 | Murphy | G07C 9/00087 382/115 |
| 2004/0215557 A1 | 10/2004 | Michelsen | |
| 2004/0250142 A1 | 12/2004 | Feyler | |
| 2005/0125360 A1 | 6/2005 | Tidwell et al. | |
| 2006/0157559 A1* | 7/2006 | Levy | G06K 17/00 235/380 |
| 2007/0255620 A1 | 11/2007 | Tumminaro et al. | |
| 2008/0174100 A1* | 7/2008 | Reeves | G06Q 50/18 283/70 |
| 2009/0183008 A1* | 7/2009 | Jobmann | H04L 9/0866 713/186 |
| 2010/0289614 A1* | 11/2010 | Rechner | G07C 9/00079 340/5.2 |
| 2011/0022531 A1* | 1/2011 | Jordan | G06Q 10/00 705/321 |
| 2012/0114192 A1 | 5/2012 | Bladel et al. | |
| 2012/0330769 A1 | 12/2012 | Arceo | |
| 2013/0013527 A1* | 1/2013 | Takata | G07C 9/00087 705/325 |
| 2014/0297530 A1 | 10/2014 | Eckel et al. | |
| 2017/0329942 A1* | 11/2017 | Choi | G06F 21/16 |
| 2017/0337278 A1* | 11/2017 | Benini | G06F 17/30864 |

OTHER PUBLICATIONS

Hassanien, "Hiding Iris Data for Authentication of Digital Images Using Wavelet Theory," Pattern Recognition and Image Analysis, Dec. 2006, 16(4):637-643.

Jain et al., "Biometrics: A Tool for Information Security," IEEE Transactions on Information Forensics and Security, Jun. 2006, 1(2):125-143.

Kim et al., "Multimodal biometric image watermarking using two-stage integrity verification," Signal Processing, Dec. 2009, 89(12):2385-2399.

Notification of Transmittal of the International Search Report and the Written Opinion of the International Searching Authority, or the Declaration dated Sep. 5, 2014 in International Application No. PCT/US2014/031306, 12 pages.

Notification of Transmittal of the International Search Report and the Written Opinion of the International Searching Authority, or the Declaration, dated Jul. 15, 2014 from International Application No. PCT/US2014/023998, 14 pages.

Notification of Transmittal of the International Search Report and the Written Opinion of the International Searching Authority, or the Declaration, dated Oct. 20, 2014 from International Application No. PCT/US2014/38788, 10 pages.

Sasi et al., "Multimodal Biometric Digital Watermarking on Immigrant Visas for Homeland Security," Biometric Technology for Human Indentification, Apr. 2004, 5004:425-435.

* cited by examiner

SYSTEM AND METHOD FOR CREDENTIAL AUTHENTICATION

CROSS-REFERENCE TO RELATED APPLICATION(S)

This application claims the benefit of U.S. application Ser. No. 14/282,339, filed May 20, 2014, which claims the benefit of Provisional Application No. 61/831,374, filed Jun. 5, 2013, both of which are incorporated herein by reference in their entirety.

TECHNICAL FIELD

This document generally relates to authenticating credential documents.

BACKGROUND

Credentials documents are routinely used to verify an identity of a person. For example, at airport security check points, passengers may be screened by a human administrator upon inspection of their identification documents and their boarding passes.

SUMMARY

In one aspect, some implementations provide a machine-assisted method for screening a person. The method includes: receiving, at a scanning device, an identification document presented by the person, the identification document showing a machine-readable code that encodes personally identifiable information of the person, a biometric of the person, and printed information; scanning the machine-readable code to extract personally identifiable information of the person; comparing the extracted personally identifiable information against records stored at a database; determining that the extracted personal identifiable information matches a record stored at the database; scanning the biometric of the person for comparison with the person presenting the identification document; receiving a determination that the biometric from the identification document identifies the person presenting the identification document; and determining whether the identification document is digitally watermarked to identify payload data.

Implementations may include one or more of the following features. The method may further include in response to determining that the identification document is digitally watermarked, retrieving the payload data from the digitally watermarked identification document; and determining a first correlation level between the retrieved payload data and the extracted personally identifiable information. The method may additionally include: determining that the first correlation level has reached a first threshold level; and confirming whether the identification document was issued in compliance with a federally mandated issuance process. The method may further include: scanning the identification document to obtain printed information based on optical character recognition; and determining a second correlation level between the printed information obtained from the identification document and the extracted personally identifiable information. The method may further additionally include: determining that the second correlation level has reached a second threshold level prior to confirming whether the identification document was issued in compliance with a federally mandated issuance process.

The method may include: receiving a confirmation that the identification card was not issued in compliance with the federally mandated issuance process; and sending instructions to verify the person's immigration status. The method may additionally include: receiving a confirmation that the identification card was not issued in compliance with the federally mandated issuance process; and sending instructions to verify the person's social security number.

The method may include receiving a driver's license of the person or receiving a passport of the person. The method may additionally include: receiving, at the scanning device, a biometric of the person presenting the identification document, the biometric taken from the person; and automatically comparing the scanned biometric from the identification document with the received biometric of the person.

In another aspect, some implementations provide computer system for screening a person. The computer system includes: a scanner configured to: receive an identification document presented by the person, the identification document showing a machine-readable code encoding personally identifiable information of the person, a biometric of the person, and printed information; scan the machine-readable code to extract personally identifiable information of the person; and scan the biometric of the person for comparison with the person presenting the identification document; and at least one processor coupled to the scanner and configured to: compare the extracted personally identifiable information against records stored at a database; determine whether the extracted personal identifiable information matches a record stored at the database; receive a determination that the biometric from the identification document identifies the person presenting the identification document; and determine whether the identification document is digitally watermarked to identify payload data.

Implementations may include one or more of the following features. The at least one processor may be further configured to in response to determining that the identification document is digitally watermarked, retrieve the payload data from the digitally watermarked identification document; and determine a first correlation level between the retrieved payload data and the extracted personally identifiable information. The at least one processor may be further configured to: determine that the first correlation level has reached a first threshold level; and confirm whether the identification document was issued in compliance with a federally mandated issuance process. The scanner may be further configured to scan the identification document to obtain printed information based on optical character recognition. The at least one processor may be further configured to: determine a second correlation level between the printed information on the identification document and the extracted personally identifiable information. The at least one processor may be further configured to: determine that the second correlation level has reached a second threshold level prior to confirming whether the identification document was issued through a process in compliance with a federally mandated issuance process.

The computer system may additionally include a display in communication with the at least one processor and configured to display information to an administrator in charge of screening the person. The at least one processor may be further configured to receive a confirmation that the identification document was issued in compliance with the federally mandated issuance process, send instructions to the display for the administrator to direct the person for expedited screening.

The computer system may additionally include a display in communication with the at least one processor and configured to display information to an administrator in charge of screening the person; wherein the at least one processor is further configured to: receive a confirmation that the identification card was not issued in compliance with the federally mandated issuance process; and send instructions to the display for the administrator to verify an immigration status of the person.

The computer system may additionally include a display in communication with the at least one processor and configured to display information to an administrator in charge of screening the person; wherein the at least one processor is further configured to receive a confirmation that the identification card was not issued in compliance with the federal mandate; and send instructions to the display for the administer to verify the person's social security number.

The computer system may include a scanner that may be further configured to receive a driver's license of the person or a passport of the person. The computer system may further include a camera to capture a photo image of the person presenting the identification document, wherein the camera may be in communication with the at least one processor, and wherein the biometric may be a facial biometric. The at least one processor may be further configured to compare the scanned biometric from the identification document with the captured photo image of the person.

In some implementations, the scanner may additionally include a platen on which to place the identification document presented by the person; and at least one scanning camera adapted to simultaneously scan the machine-readable code and the biometric from the identification document placed on the platen. The at least one scanning camera may be further configured to scan printed information from the identification document Implementations of the above techniques include a method, computer program product and a system. The computer program product is suitably embodied in a non-transitory machine-readable medium and includes instructions executable by one or more processors. The instructions are configured to cause the one or more processors to perform the above described actions including: receiving personally identifiable information of the person extracted by scanning a machine-readable code from an identification document presented by a person; comparing the extracted personally identifiable information against records stored at a database; determining that the extracted personal identifiable information matches a record stored at the database; receiving a biometric scanned from the identification document for comparison with the person presenting the identification document; receiving a determination that the scanned biometric identifies the person presenting the identification document; and determining whether the identification document is digitally watermarked to identify payload data.

The system includes one or more processors and instructions embedded in a non-transitory machine-readable medium that are executable by the one or more processors. The instructions, when executed, are configured to cause the one or more processors to perform the above described actions. The default position is not to use any external databases, but the system could be configured to perform a database check if needed.

The details of one or more aspects of the subject matter described in this specification are set forth in the accompanying drawings and the description below. Other features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
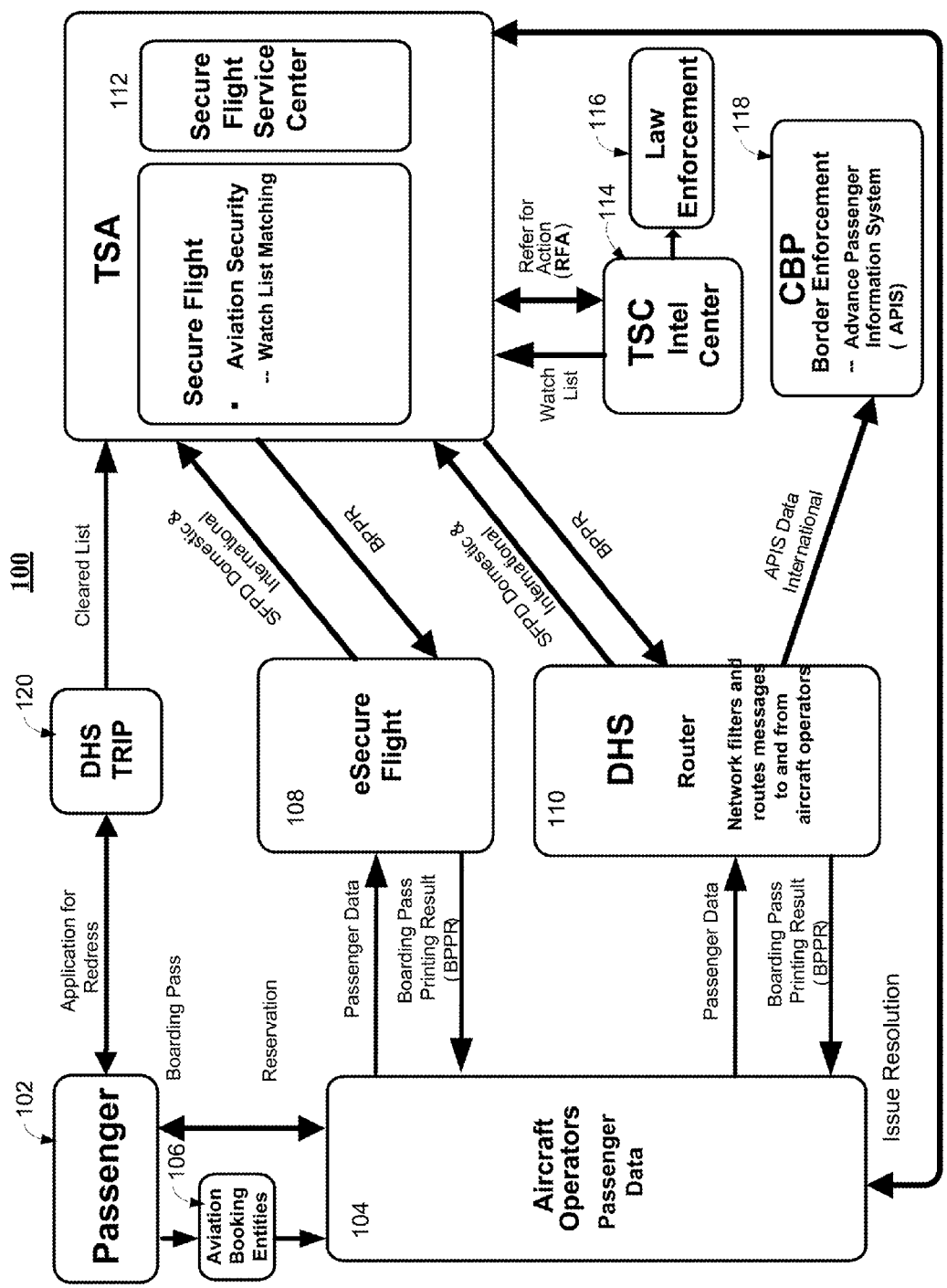
FIG. 1 illustrates an example flight security checking process flow for screening passengers.

To provide security, for example, during airline flights, passengers are customarily screened at airport security check points. In many airports, passengers are screened based on inspections of their identification documents and their boarding passes. For example, a human administrator, sometimes known as a travel document checker (TDC), may manually inspect the identification document to verify that the identification document is authentic. The TDC may then compare the portrait on the identification document with the passenger to verify that the passenger is the holder of the identification document. The TDC may also compare the name of the passenger as printed on the identification document to verify that the passenger to take the flight is the same person as the person holding the identification document. In sum, security screening at a particular security check point may seek to accomplish: (a) authenticating the identification document presented as genuine; and (b) verifying the passenger as the true holder of the identification document. Some implementations as discussed herein may combine the above objectives with an additional objective of establishing enhanced confidence in the document issuance process. Taken together, the implementations disclosed herein can provide security screening, for example, at airport checkpoints, with improved screening efficacy, customer experience, and screening throughput.

To provide high throughput for security screening of, for example, passengers at an airport, passengers are triaged based on their accompanying identification documents. Generally, screening process may include primary screening and secondary processing. Primary screening may include manual inspection of the identification documents and manual comparison of the portrait on the identification documents and the passenger holding such documents. If exceptions are detected during primary screening of a passenger, the passenger may be directed to secondary screening that can handle, for example, non-compliant identification documents, worn-out identification documents, etc. The average time for primary screening can be about 15 seconds per passenger. Depending on contexts, passengers may to be processed in under about 10 seconds. For example, document authentication system may take 6-7 seconds to scan a credit-card sized identification card. In addition to scanning an ID card, passenger handoff time may amount to no less than 4 seconds.

Implementations discussed herein may include a machine-implemented process to scan both the front and back of a given identification document in about 2 seconds. Some implementations may include primary screening method of reading digital watermark (DWMs). Implementations discussed herein may allow total passenger processing time to be reduced to about 6 seconds (including the passenger handoff time of about 4 seconds). Moreover, some implementations discussed herein may include an additional discriminator to establish confidence in the issuance of the identification document. For example, during screening, the identity of a passenger who possesses a digital watermarked identification document that complies with the requirements of a federally mandated process and whose face matches that on the identification document may be verified with a higher degree of confidence. An example of such a federal mandate may include the REAL ID Act of 2005, Pub.L. 109-13, 119 Stat. 302, or the similar legislations such as, for example, the proposed PASS ID legislation. Outside the U.S., similar legislations have been enacted, or about to be enacted, to pursue, for example, a national identification card.

For context, a multitude of interactions may take place between the passenger, commercial entities, and government agencies. These interactions may be performed in the background, for example, before the passenger, as a person in the public, even arrives at an airport. In performing the multitude of interactions, the scenarios for a passenger to engage the commercial entities and government agencies can become overwhelmingly burdensome.

FIG. 1 illustrates example flight security checking process flow 100 for screening passengers that may take place even outside an airport. For example, passenger 102 may book an airline ticket from an aircraft operator 104. Example aircraft operators may include any commercial airline. When booking the airline ticket, passenger 102 may book the airline ticket through intermediaries such as aviation booking entities 106. Example aviation booking entities may include booking entities such as Expedia®, Hotwire®, Orbitz®, Priceline®, or airlines. The reservation placed by passenger 102 may turn into a boarding pass for the booked flight.

In making the reservation, aircraft operator 104 may obtain passenger data from passenger 102. The passenger data may then be transmitted to a server running a flight database 108 for verification. The server may in turn transmit the secure flight passenger data for domestic and international flight to Transportation Security Administration (TSA) for agency verification. Outside the U.S., a TSA equivalent may exist. For example, in Canada, the equivalent agency is the Canadian Air Transport Security Authority (CATSA). In Europe, the equivalent agency may be the European Aviation Safety Agency (EASA). In the TSA example, the agency secure flight verification may include checking the passenger's data against a watch list maintained at the secure service center 112. The watch list may originate from an intelligence center 114 at the TSA. The intelligence center 114 may interact with other law enforcement agencies at home and abroad to update the watch list. In maintaining the watch list, intelligence center 114 may issue or receive various refer for action (RFAs) to/from service center 112. If no match has been found or no match has been found after a certain time frame has expired, service center may advise the secure flight server 108 to proceed with issuing boarding pass printing result (BPPR).

Airline operator 104 may also transmit passenger data to department of homeland security (DHS) router 110. The router may filter and route messages to and from aircraft operators. For example, passenger data may be routed to TSA secure flight service center 112 for verification as discussed above. Additionally, passenger data may be routed to Custom and Border patrol (CBP) 118. An advanced passenger information system (APIS) may be located at CBP 118 for verification of passenger data if the flight is an international flight.

If, however, passenger 102 was mistakenly placed on a watch list and was consequently denied boarding pass, then passenger 102 may participate in a DHS Traveler Redress Inquiry Program (TRIP) 120. During participation, passenger 102 may bring additional documentation to apply for redress and get his/her name cleared from the watch list.

At airport check point, the transportation security administration (TSA) travel document checker (TDC) may manually inspect the identification document presented by the passenger to verify that the identification document is authentic, for example, issued by the purported authority and not forged. The TDC may additionally manually inspect the name printed on the identification document and the name printed on the boarding pass to verify that the passenger matches the purported holder of the identification document. The TDC may also inspect the flight number, gate number, boarding time, etc. to verify that the passenger is at the right check point and at the right time. The TDC may additionally manually compare the photo portrait on the identification document with the passenger's face to verify that the passenger is the person portrayed by the identification document. If the verifications are satisfactory, the TDC may make a mark on the boarding pass to note that the verifications are complete and direct the passenger through the line. If, however, the passenger cannot be verified in one of the above steps, the TDC may direct the passenger to the side for additional checking to verify the passenger's identity. Some mobile applications may offer a mobile boarding pass issued to, for example, a smart phone of the passenger. Even with the mobile boarding passes, customer experience with security screening as discussed above may still be filled with frustration and dissatisfaction.

The vast majority of travelers are harmless but they are still subjected to extensive screening based on their identification document because of the prevalent likelihood of forged identification document. The low confidence in the authenticity of the identification document may render the screening system more vulnerable because this low confidence may disallow agencies such as the TSA (or an equivalent agency) to focus on individuals that pose a real risk to public security. In particular, such vulnerabilities may manifest as a slow screening process, manual and repetitive checking prone to human errors due to, for example, fatigue, lack of experience, etc. These vulnerabilities may further lead to lowered security in screening outcome and lowered overall confidence in the screening system.

In the context of an identification document checkpoint, strong assurance in the identity of a person being screened can be established by instituting machine-assisted mechanisms to achieve (i) high confidence in document authentication; (ii) high confidence in biometric verification; and (iii) high confidence in the document issuance process.

When these machine-assisted mechanisms are combined with other operator-centric procedures such as watch list matching and behavior detection, risks associated with expedited security screening may be mitigated, for example, by redirecting those who fit the requirements of these machine-assisted mechanisms and would otherwise be directed to expedited screening back to normal screening.

Figure 2A:
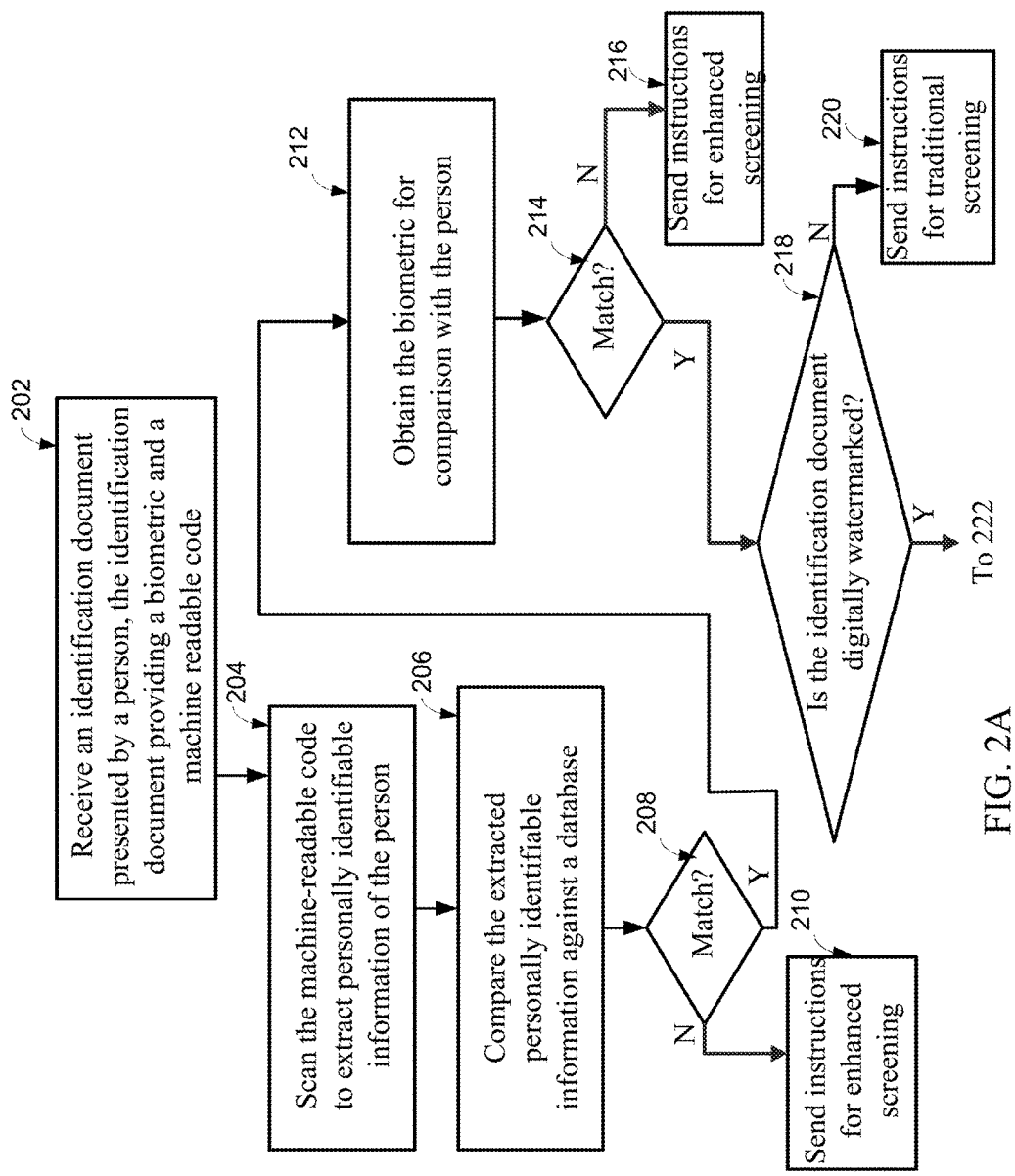
FIG. 2A is flow chart showing a portion of an example process for screening a person according to some implementations.

FIG. 2A is flow chart showing a portion of an example process for screening a person according to some implementations. At a security check point, a traveler may present an identification document showing a biometric of the traveler and a machine-readable code. A identification document, as discussed in this application, may include a driver license, a passport, a permanent resident card, a social security card, etc. An example of the identification document is an ID-1 card. As an illustration, the dimension of ID-1 as set forth by ISO/IEC 7810 standard is nominally 85.60 by 53.98 millimeters (3.370 in×2.125 in), which is about the size of a credit card. Another dimension standard may be ID-000 which is nominally 25 by 15 millimeters (0.984 in×0.591 in). For both standards, the thickness is 0.76 millimeters (0.030 in). Yet another example identification document is a passport or other International Civil Aviation Organization (ICAO) document. Still another example identification document is a Non-ICAO international identity document.

The identification document may be issued by a government entity, for example, the department of motor vehicles at the state level, or the state department at the federal level. The identification document may also be issued by non-government entities, such as a contracting entity of a government agency. The use of these identification documents is becoming increasingly common in our society. For example, a valid government-issued identification document may be trusted and relied upon for a variety of applications because the holder of this identification document generally has been authenticated or background-checked (e.g., vetted) by the government during the application process. Verifying the identity of a traveler by validating the government-issued identification document of the traveler may provide a high probability that the traveler is who he or she purports to be. This validation may be accomplished with no significant comprise in speed and convenience.

The biometric may be a piece of data capable of uniquely identifying the biologic person who hold the identification document. Example biometrics may include, for example, a facial biometric, such as a facial portrait of a holder of the identification document. In some implementations, the biometric may also be a finger print, an iris scan, a retina scan, a pupil scan, etc. of the holder of the identification document.

The machine-readable code may include a bar code, a quick-response (QR) code, any other symbology code, or data encoded in the magnetic stripe of the identification document. The machine readable code may encode personally identifiable information of the holder of the identification document. Personal identification information (PII) may be any information about an individual maintained by an agency, including (1) any information that can be used to distinguish or trace an individual's identity, such as name, social security number, date and place of birth, mother's maiden name, or biometric records; and (2) any other information that is linked or linkable to an individual, such as medical, educational, financial, and employment information may include name, address, date of birth, residential address, occupation, marital status, eye color, hair color, height, weight, blood type, etc.

In some implementations, the presented identification document may be received at, for example, a scanning device (202). The scanning device may also be known as a scanner, a detector, etc. The scanning device may include photo-sensitive cameras to scan the front or back of the identification document under different lighting conditions such as visible light, infrared, and ultraviolet. The photo-sensitive cameras may include, for example, a charge-coupled device.

The machine-readable code may be scanned so that the encoded personally identifiable information of the holder of the identification document may be extracted (204). For example, the identification document may include at least one machine readable zone (MRZ) with a printed bar code, a QR code, or other symbology code. The MRZ may also include printed microtext, digital watermark embedded as frequency domain information associated with Moire's patterns, etc. The MRZ may also include a magnetic stripe encoded with personally identifiable information of the holder of the identification document. The MRZ may be scanned optically by infrared-laser (e.g., at 1060 nm wavelength), by visible light, etc. In one configuration, personal identification information obtained from machine-readable codes at various MRZs on the same identification document may be cross-correlated to verify the authenticity of the identification document. For instance, the cross-correlation may be performed automatically.

The extracted personally identifiable information may be compared against records stored at a database (206). The database may be remote, for example, at a central server. The central server may be under the Security Technology Integration Program (STIP). The database may also have a local copy stored at, for example, the host computer of the scanning device. The local copy may be synchronized with the central server regularly, for example, on an hourly or daily basis.

The comparison may include determining whether there is a match between the extracted personally identifiable information and a record in the database (208). If there is no match between the extracted personally identifiable information and any records in the database, a presumption of illegitimate presence at the airport or a forged identification document may be raised and the traveler who presented the identification document may be routed to enhanced screening in accordance with, for example, TSA (or an equivalent agency) guidelines/protocols (210). Enhanced screening may include more detailed and/or manual inspection of the presented identification documents, pat-down on the traveler, or whole-body scans. Enhanced screening may take longer than normal scanning and may only be used occasionally to travelers that may, for example, pose an uncertainty in identity.

If there is a match between the extracted personally identifiable information and a record of the database, then a presumption may be raised that the passenger is expected at the airport. Thereafter, the biometric on the identification document may be scanned for comparison with the person to verify that the person presenting the identification document is the person identified by the identification document (212). In some implementations, the scanned biometric may be the scanned facial portrait from the identification document. The scanned facial portrait may be at a resolution of, for example, 600 dots per inch (dpi). The scanning resolution may be higher or lower, depending on, for example, scanner speed, scanner memory size, output display resolution, etc. Example output display resolutions may be as high as, for example, 1600×1200 dpi. The scanned facial may be displayed on the output display for a human administrator, for example, the travel document checker (TDC). The scanned facial portrait may be displayed at about the same level or similar size as the face of the traveler being screened. The TDC may make a determination as to whether the traveler's face matches the one being portrayed on the identification document.

In some implementations, the scanned biometric may include the scanned facial portrait, finger print, iris image, pupil image, or retina image, etc. The scanned biometric may be automatically compared against a biometrics of the same type taken from the traveler at the check point. The scanned biometrics may be at a resolution of, for example, 300-600 dots per inch (dpi). The scanning resolution may be configurable, depending on the complexity of the pattern being scanned, the level of matching desired, the speed of comparison/matching desired, etc.

Figure 2B:
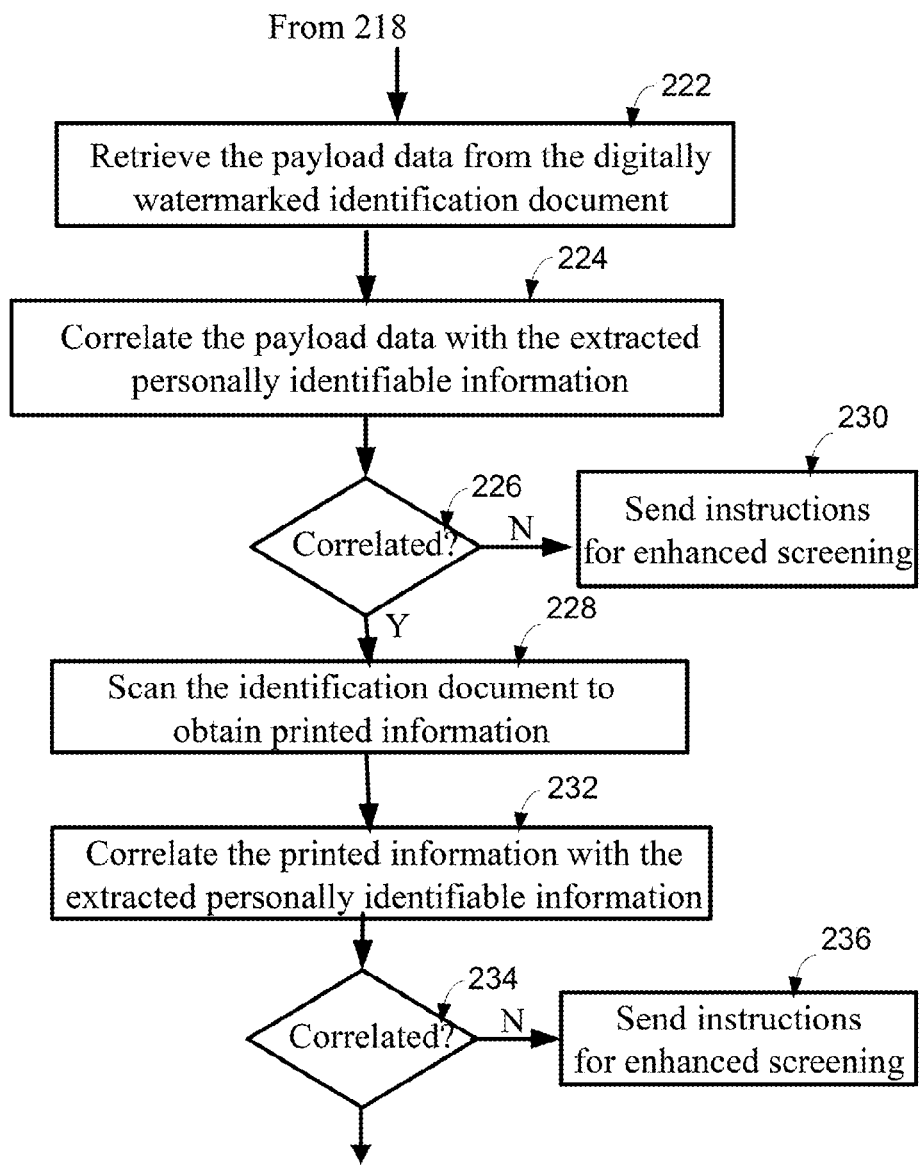
FIG. 2B is flow chart showing a portion of an example process for screening a person according to some implementations.
Figure 2C:
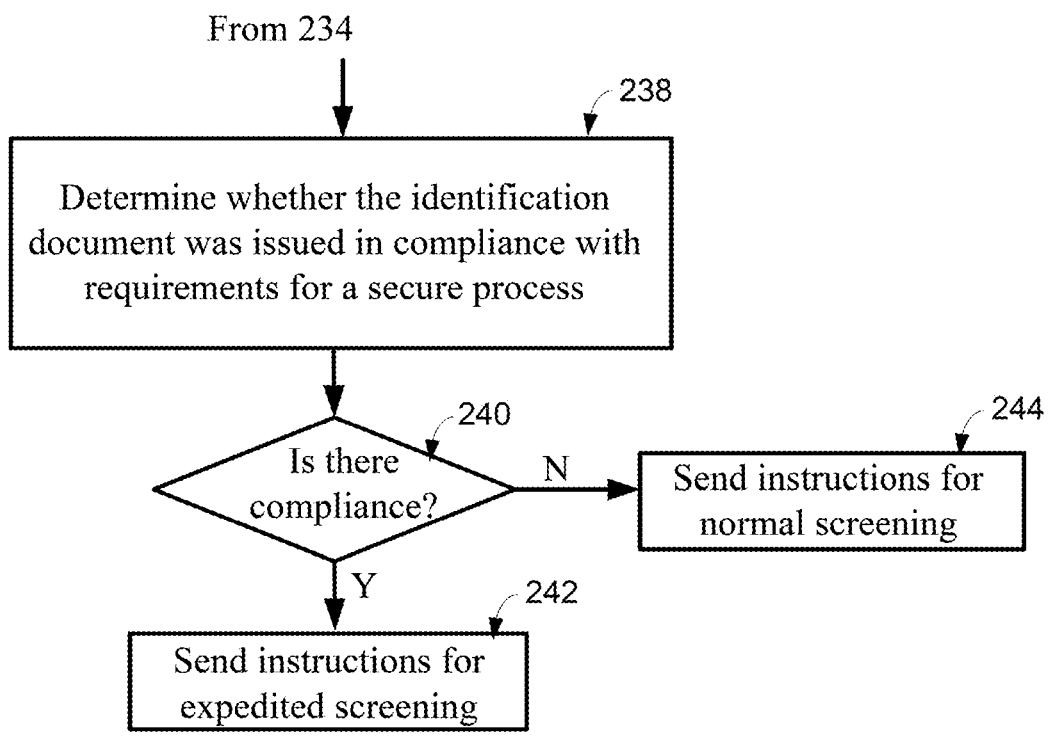
FIG. 2C is flow chart showing a portion of an example process for screening a person according to some implementations.
Figure 2D:
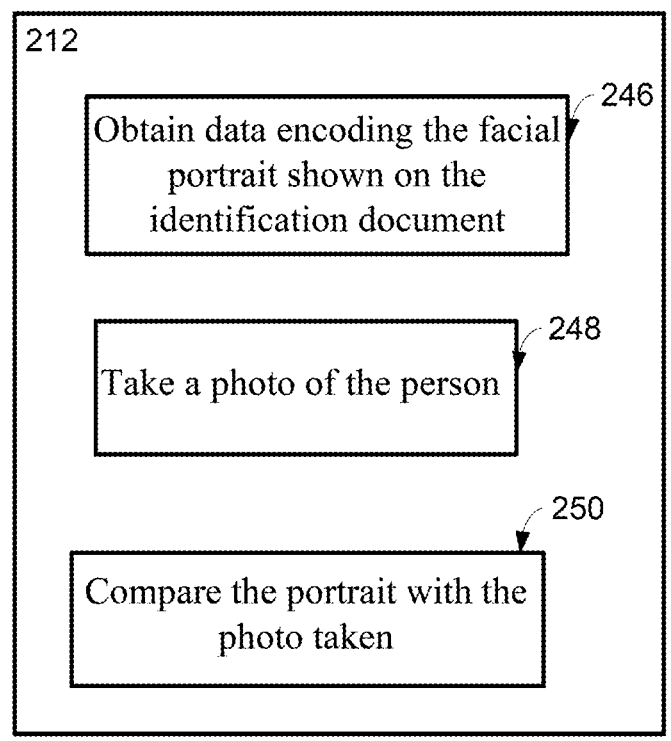
FIG. 2D is flow chart showing a portion of an example process for screening a person according to some implementations.

Referring to FIG. 2D, some implementations may automatically compare the facial biometric on the identification document with a facial portrait of the traveler taken at the check point. A scanning device may obtain the facial portrait from the identification document, for example, at a resolution of 600 dpi (246). For example, some identification documents may include a chip that stores the data encoding the facial portrait as shown on the identification document. The scanning device may obtain the data encoding the facial portrait from the chip. For example, the scanning device may download the data encoding the facial portrait from a database of the issuing authority (such as the department of motor vehicles or the State Department). In some implementations, the data encoding the facial portrait (or other biometrics) may be downloaded from the issuing authority at the time of booking and stored along with the Secure Flight information for automated comparison at the time of airport check-in. A camera, for example, a digital camera, may take a photo of the traveler at the check point (248). The photo may include the traveler's face with sufficient detail and in a similar orientation as the facial portrait on the identification document. The scanner device may automatically compare the scanned portrait with the traveler's face in the photo taken at the check point (250). The comparison may use any facial recognition software. The facial recognition software may remove background from the photo so that only the facial portrait of the person remains. The comparison may yield a quantified degree of likeliness. A threshold may be configured by a human administrator, such as the TDC, to be the cut-off level. If the degree of likeliness is greater than or equal to the threshold, then the scanned portrait may be deemed as a match to the traveler's face. If, however, the degree of likeliness if less than the threshold, then the scanned portrait may not be deemed as a match to the traveler's face. The threshold may be judicially chosen to reduce the incidents of false positives and/or false negatives, depending on the contexts.

Returning to FIG. 2A, a determination may be received as to whether there is a match between the scanned biometric and the biometric of the traveler taken at the check point (214). If the determination is that there is no match between the scanned biometric and the biometric of traveler taken at the check point, then a presumption that the traveler is not the person identified by the identification may be raised. As a result, instructions may be provided to the TDC to direct to traveler to enhanced screening (216) in accordance with TSA (or an equivalent) regulations or guidelines. Enhanced screening may only be applied to a small percentage of travelers, as discussed above.

If the determination is that there is a match between the scanned biometric and the biometric of the traveler taken at the check point, then the traveler's identity may be presumed to be the person identified by the identification document. Thereafter, the process flow may proceed to determining whether the identification document has been digitally watermarked to identify payload data (218). For example, in some implementations, the digital watermark may carry payload data.

Digital watermark can identify, for example, the legitimate source of the identification document. The digital watermark may be, for example, embedded in the background image of a state-issued driver license or in the portrait of the document holder. The digital watermark may include digital codes embedded into the media of the identification document. The media may include paper, plastic, magnetic media, etc. The digital watermark may be generally imperceptible to naked eyes. In fact, the digital watermark may generally appear as noise, for example, added to a background noise. However, the digital watermark can uniquely validate and authenticate the identification document and identify information about the identity of the holder, also known as personally identifiable information (PII). Altering a digital watermark may be virtually impossible, and the mere fact of a missing digital watermark can immediately indicate tampering and likely counterfeiting. Hence, digital watermarks used in a identification document may provide strong and effective deterrence to counterfeiting. In addition, in granting a government-issued identification document, the government generally has verified the applicant's identity according to an established and elaborate protocol (for example, as mandated by legislations like the REAL ID ACT or the proposed PASS ID legislation or similar legislations). Because of the inherent government authority in granting and issuing the government-issued identification document, possession of a valid government-issued identification document may strengthen the proof of the identity of the document holder.

Digital watermarking may be secure, covert to the naked eye and machine-readable. To validate the government-issued identification document, the digital watermark may be analyzed, for example, by steganography to reveal the information identifying the holder (the personally identifiable information). In addition, data contents encoded by the digital watermarks may be encrypted so that the encoded data contents may remain secure, as an additional security mechanism. In some implementations, the digital watermark may be initially analyzed to extract frequency domain information. The frequency domain information may include spectrum information manifested by, for example, the digital cosine transform (DCT) coefficients in a particular spatial frequency range. In contrast to spatial domain information, such frequency domain information may be robust to cropping or translation of the original document. Hence, the frequency domain information may be more tamper-proof and more resilient to artifacts during field use. Likewise, mixed-domain information, i.e., information from both spatial domain and frequency domain may provide similar degree of robustness against tampering and artifacts. However, the implementations disclosed herein are not limited to the use of frequency domain information alone or the use of mixed-domain information. Spatial domain information may be used according to the same scheme as disclosed herein.

The frequency domain information may encode a pattern for validation purposes. The pattern may be chosen by the issuing authority and remain secretive to the outside world.

To validate the government-issued identification document, the frequency domain information may be compared with the known pattern. In some implementations, the comparison may be performed at a scanner device at the checkpoint. In some implementations, the scanner device at the checkpoint may send the extracted frequency domain information to a central server for the comparison.

The comparison may determine whether there is a substantial match between the extracted frequency domain information and the known pattern. The extracted frequency domain information may not perfectly match the known pattern. In some implementations, for example, the frequency domain information may be incomplete due to losses in the scanning process. In some implementations, the degree of match may depend on the security level at the time of security screening. For example, if the National Terrorism Advisory System (NTAS), or an equivalent agency, has issued a heightened alert, then the degree of match may be increased. In some implementations, the matching process may depend on jurisdiction. For example, in some states which adopted a less sophisticated digital watermark, a more primitive match procedure may be performed. Even in states that have adopted a more sophisticated digital watermark, legacy identification documents issued before the adoption may still use the old and less sophisticated digital watermarking. These legacy identification documents, if unexpired, may still be honored by a more primitive matching procedure. In some implementations, determining whether there is a substantial match may further factor in prior history of the holder of the government-issued identification document. For example, if the holder of the government-issued identification document has been a frequent traveler at the airport, or if the holder of the government-issued identification document has been registered in the TSA Pre® program (or comparable programs of an equivalent agency), then the degree of match may be lessened to simplify the process. A trusted passenger database can be set up if needed.

If the determination is that the identification document has not been digitally watermarked, then the authenticity of the identification document may be determined by, for example, verifying other security features on the identification document that do not rely on the digital watermark of the identification document (220). If the determination is that the identification document contains an illegible digital watermark or a digital watermark that appears to have been tampered with, instructions may also be provided to the TDC to direct the passenger to enhanced screening.

Referring to FIG. 2B, which shows a portion of an example process for screening a person according to some implementations, if the determination is that the identification document has been properly digitally watermarked to identify payload data, then the payload data may then be retrieved from the digitally watermarked identification document (222). The payload data may generally encode personally identifiable information (PII) of the holder. As discussed above, personally identifiable information may also be extracted from machine-readable codes at, for example, multiple MRZs on the identification document.

In some implementations, the personally identifiable information (PII) retrieved from the digital watermark may be correlated with the extracted personally identifiable information from the machine-readable codes (224). The correlation may be performed at the scanner device at the check point. The correlation may include textual comparison to compare the textual strings for such personally identifiable information as name (including full name, first name, last name, middle name, and initials), residential address, gender, nationality, occupation, marital status, eye color, hair color, blood type etc. The personally identifiable information may also include numerical terms such as date of birth, height, weight, election zone, document number, issue date, etc. The numerical terms may be compared numerically or based on the corresponding American Standard Code for Information Interchange (ASCII) characters.

The correlation may depend on the quality of the readout from the digital watermark and/or the machine-readable code, which in turn may hinge on the wear-and-tear of the identification document. The correlation may also depend on the level of sophistication in embedding the PII in each MRZ or encoding the PII in the digital watermark by the jurisdictional authority issuing the identification document. Some jurisdictions may implement more sophisticated identification document with improved complimentary readout from the MRZs and the digital watermark. Within the same jurisdiction, however, more recently issued identification document may have more sophisticated MRZ and/or digital watermark implementations.

The correlation may yield a numerical correlation level. A threshold level may be configured by a human administrator, e.g., the TDC, as a cut-off level. The correlation level may then be compared against the threshold level. If the correlation level is greater than or equal to the threshold level, then the retrieved PII from the digital watermark may be determined as correlated with the extracted PII from the machine-readable code in a particular MRZ. If, however, the correlation level is less than the threshold level, then the retrieved PII from the digital watermark may be determined as uncorrelated with the extracted PII from the machine-readable code in a particular MRZ. The threshold may be judicially chosen to strike a trade-off between sensitivity and specificity, depending on the contexts.

If the retrieved PII from the digital watermark is determined as not correlated with the extracted PII from the machine-readable code of a MRZ, then a presumption may be raised against the authenticity of the identification document. In this event, instructions may be provided to the human administrator, e.g., the TDC, to direct the passenger to enhanced screening (230) in accordance with TSA regulations and guidelines, as discussed above.

If the retrieved PII from the digital watermark is determined as correlated with the extracted PII from the machine-readable code of a MRZ, then the authenticity of the identification document may be presumed. In some implementations, to further boost confidence in the authenticity of the identification document, the process flow may then proceed to scan printed information from the identification document (228). The printed information may be, for example, at the front of the identification document, showing name (including full name, first name, last name, middle/initials), residential address, gender, date of birth, height, weight, nationality, occupation, marital status, eye color, hair color, height, weight, blood type, election zone, document number, issue date, etc. Such printed information may be scanned by optical character recognition (OCR) technology. Once scanned in, the printed information may be correlated with the extracted personally identifiable information in the same manner as discussed above (232). The correlation may yield a numerical correlation level. A threshold level may be configured by a human administrator, e.g., the TDC, as a cut-off level. The correlation level may then be compared against the threshold level. If the correlation level is greater than or equal to the threshold level, then the printed information scanned in may be determined as correlated with the extracted PII from the machine-readable code in a particular MRZ. If, however, the correlation level is less than the threshold level, then the printed information scanned in may be determined as uncorrelated with the extracted PII from the machine-readable code in a particular MRZ.

If the correlation level between the printed information and the extracted PII is determined as insufficient, then a presumption may be raised against the authenticity of the identification document. In this event, instructions may be provided to the human administrator, the TDC, to redirect the traveler to enhanced screening in accordance with TSA (or an equivalent agency) regulations and guidelines, as discussed above (236). If the determination is that the correlation level between the printed information and the extracted PII is sufficient, then confidence in the authenticity of the identification document may be further strengthened. In some implementations, the PII extracted from different MRZ's on the same identification document may be correlated with each other in a manner consistent with the discussion herein to further strengthen the confidence in proving authenticity of the identification document.

Referring to FIG. 2C, a flow chart showing a portion of an example process for screening a person according to some implementations, the process flow may then proceed to establish confidence in the issuance process of the identification document. In some implementations, the identification document may be scanned to determine whether the identification document was issued in compliance with a federal mandate designed to secure the issuance process. Example federal mandate may include the REAL ID Act of 2005 which set forth requirements to improve security for driver's license and personal identification cards for official federal purposes. Federal official purposes are defined as: boarding federally regulated commercial aircraft; accessing federal facilities that require identification to enter; and entering nuclear power plants. Of note is that department of homeland security (DHS) announced on Dec. 20, 2012 that thirteen (13) states were determined to meet the REAL ID standards. As of 2011, forty-one (41) states, plus District of Columbia, have embraced REAL ID implementations without DHS support or new monies. As of March 2013, 48 of 56 jurisdictions (the 50 states plus D.C. and the five island territories) have digitized vital records to close the gap on REAL ID. Similar legislation may be enacted to provide additional confidence in the issuance process, such as, for example, the PASS ID legislation.

Proof of compliance with the REAL ID Act of 2005 may manifest as a label on the identification document. The label may be issued by the issuing authority. The label may be tamper-proof and include anti-counterfeit features. The label may include obfuscated features readable only by machines. In determining whether there is compliance with the federal mandate (240), some implementations may read the label. Some implementations may compare the issue date to the REAL ID certification date of that jurisdiction. If the issue date is on or after the certification data of compliance at the issuing jurisdiction, then the identification document may be determined as compliant with the REAL ID Act. Some implementations may include additional rules to account for intermittent compliance. For example, when the issuing jurisdiction is not continuously compliant, then the periods of non-compliance may be excluded in determining whether the identification document was issued in compliance with the REAL ID Act.

Determining whether the identification document is in compliance with the federal mandate may establish a confidence level in the issuance process. If the identification document is determined as compliant, then there may be a presumption that the issuance process was secure. In this event, instructions may be provided to a human administrator, e.g., the TDC, to direct the traveler to expedited screening (242). If, however, the identification document is determined as non-compliant, then a presumption may be raised against the security of the issuance process. In that event, instructions may be provided to the TDC to direct the traveler to normal (non-expedited) screening in accordance with TSA (or an equivalent agency) regulations and guidelines (244).

Figure 3A:
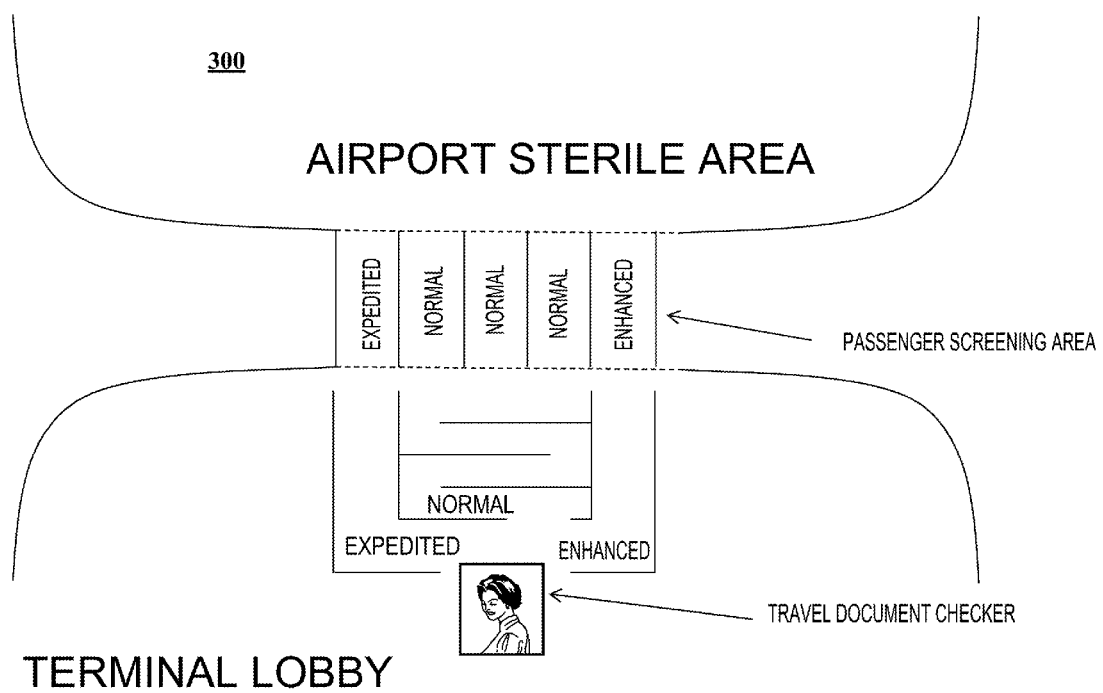
FIG. 3A illustrates an example scenario in passenger screening at an airport with minimal security enhancement measures.

FIG. 3A illustrates passenger screening scenario 300 with minimal security enhancement features. At a check point of an airport terminal lobby, a TSA (or an equivalent agency) travel document checker (TDC) may check the travel documents of each passenger. The screened passengers may then proceed to sterile areas to wait for and board their flights. The TDC may be presented with the boarding pass and an identification document of the traveler. With minimal security enhancement measures, the TDC may need to manually verify that (i) the name printed on the boarding pass is the same as that printed on the identification document; (ii) the traveler is at the right check point for his/her flight, game number, boarding time, etc.; (iii) the identification document is authentic (i.e., no signs of forgery or expiration); and (iv) the traveler appears to be the same person as portrayed by the identification document. This process may be predominantly manual. Screening tens of thousands of travelers daily can become tedious. Thus the process may be more prone to human errors. More significantly, however, such screening process can only establish limited confidence in the authenticity of the identification document and the verification of a traveler's facial biometric. Thus, although more travelers are legitimate passengers posing no harm, most travelers are still directed to normal screening that can include, for example, baggage scan, body scan, etc. Hence, the public complaint in long lines and delays at airport check-in, as illustrated by scenario 300 in FIG. 3A.

The long delay caused by security check at airport may be reduced by security enhancement measures. Specifically, some implementations can establish (i) increased confidence in the authenticity of the identification document; (ii) increased confidence in the verification of the biometric shown in the identification document; and (iii) increased confidence in the security of the issuance process of the identification document.

As discussed above, to authenticate the identification document, the digital watermark of the identification document may be verified to confirm the source of the identification document, the payload data from the digital watermark may be correlated with personally identifiable information extracted from machine-readable code. Additionally, the personally identifiable information from machine readable codes of various machine-readable zones on the same identification document may cross-correlated. The authentication process may be fully automatic, without user intervention. The authentication process may also be operator-assisted (in setting threshold levels to strike a trade-off between sensitivity and specificity).

To verify the biometrics, for example, a facial biometric, some implementations may scan the facial biometric from the identification document at high resolution and display the scanned facial biometric on an output device at about the same level as the travel and at comparable size. The biometrics could also be finger prints, iris patterns, retina patterns, or pupil patterns. Some implementations may automatically compare the scanned biometric with a biometric taken of the traveler at the check point.

For state-issued identification documents such as a driver license that complies with a federal mandate to secure the issuance process, confidence in the issuance process may be obtained by confirming that the identification document was issued in compliance with the federal mandate. When a traveler's identification document passes the above verifications, the traveler may be directed to expedited screening.

Figure 3B:
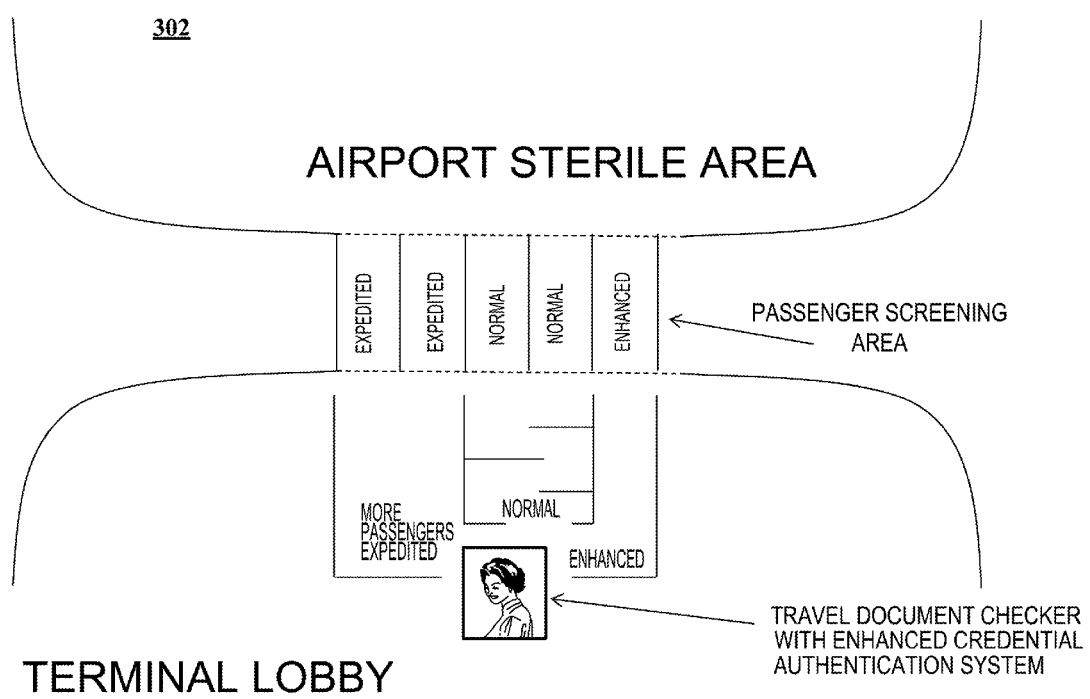
FIG. 3B illustrates an example scenario in passenger screening at an airport with security enhancement measures according to some implementations.

As illustrated by scenario 302 in FIG. 3B, with security enhancement measures, an increased number of travelers are expected to be routed to expedited screening. Thus, some implementations may benefit passenger screening at airport check points by improving the screening efficacy, user experience, and screening throughput.

Figure 4:
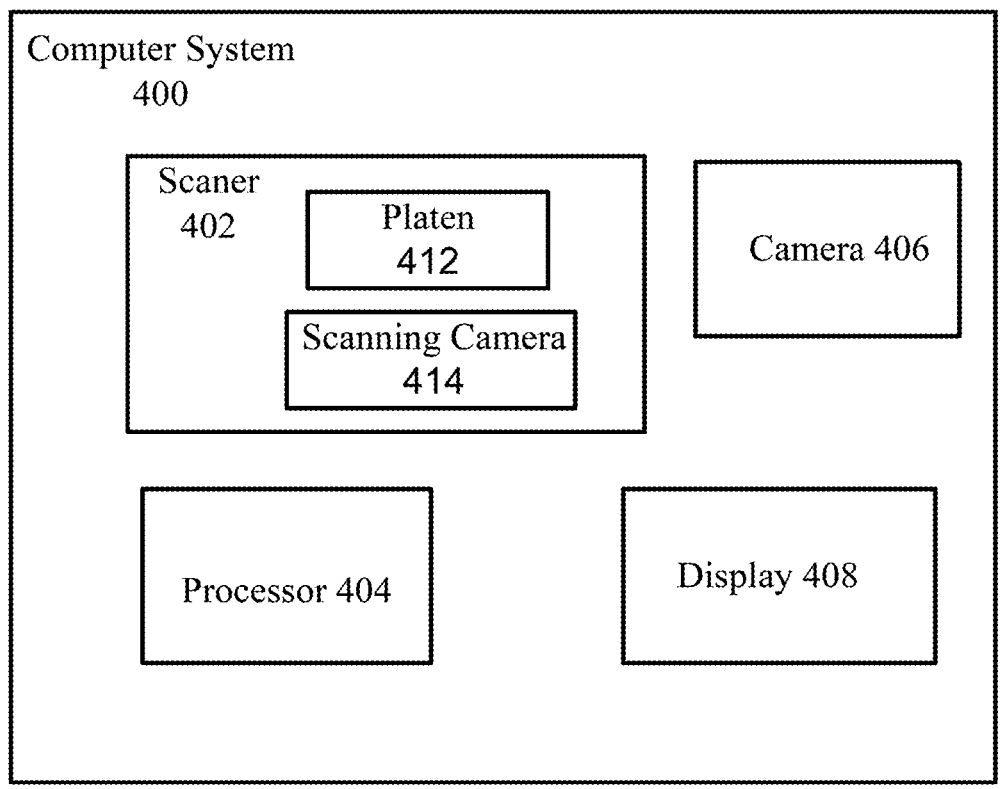
FIG. 4 shows an example computer system according to some implementations.

FIG. 4 shows an example computer system 400 according to some implementations. Computer system 400 may include scanner 402, processor 404, camera 406, and display 408. Scanner 402 may also be known as a scanning device, or a detector. In some implementations, the scanner may be configured to receive an identification document presented by a traveler, for example, at airport security check-in. The identification document may include a machine-readable code and a biometric of the holder. Example machine-readable code may include a bar code, a QR code, any other symbology code, or data encoded on a magnetic stripe on the identification document. Example biometrics may include a facial biometric, a finger print, an iris pattern, a retina pattern, etc. Scanner 402 may also be configured to scan the machine-readable code. As discussed above, personally identifiable information may be extracted from scanning the machine-readable code, as discussed above. Scanner 402 may be configured additionally scan the biometric. As discussed above, the biometric may be scanned at sufficient resolution to enable downstream processing or display.

In some implementations, scanner 402 may include platen 402 on which an identification document, such as a state-issued driver's license, may be placed. Platen 402 may provide a flat and transparent surface to facilitate optical scanning. Scanner 402 may additionally include scanning camera 414 for scanning the identification document placed on the platen. In some implementations, scanner 402 may include two scanning cameras to simultaneously scan the front and the back of, for example, a state-issued driver's license.

In some implementations, processor 404 may be coupled to scanner 402 to receive data, for example, the extracted personally identifiable information, the scanned biometric, etc. Processor 404 may compare the extracted personal identification information against records stored at a database. As discussed above, the database may be at a remote server or may be located on computer system 400. Based on the comparison, processor 404 may determine whether the extracted personally identifiable information matches a record stored at the database. If such a match has been identified, processor 404 may provide instructions to a human administrator, e.g., the TDC, to direct the traveler to expedited screening. The instructions may be provided to display 408. If no such match can be found, then processor 404 may proceed further to determine whether the identification document has been digitally watermarked to verify the source of the identification document. The determination may be based on a scanned image of the identification document, or any portions of the identification document, such as the biometric.

If processor 404 determines that the identification document has been digitally watermarked, processor may retrieve payload data from the digital watermark as discussed above. Thereafter, processor 404 may determine a first correlation level between the retrieved payload data and the extracted personally identifiable information. If the correlation level has reached a threshold level, the authenticity of the identification document may be established with increased confidence.

In some implementations, confidence in the authenticity of the identification document may be further strengthened by checking a correlation between the extracted personally identifiable information and the printed information on the identification document. For example, scanner 402 may perform an optical scan of the identification document and read in the printed information by using optical character recognition (OCR) technology. Thereafter, processor 404 may be configured to compute a correlation between the printed information and the extracted personally identifiable information. If the correlation level has reached a threshold level, confidence in the authenticity of the identification document may be further strengthened. If, however, either of the two correlation level fails to reach the corresponding threshold level, processor 404 may cause instructions to be displayed on display 408 requesting the human administrator, e.g., the TDC, to redirect the traveler to enhanced screening in accordance with TSA regulations and guidelines.

After confirming the authenticity of the identification document, processor 404 may further confirm whether the identification document was issued in compliance with a federally mandated issuance process. Example federal mandates may include the REAL ID Act of 2005. As discussed above, compliance with a federal mandate to secure the issuance process may be prima facie evidence that the identification document was issued through a secure process. Determining the compliance with the federal mandate may add confidence in the security of the issuance process itself.

If the identification document was not issued in compliance with the federal mandate, processor 404 may generate instructions on display 408 requesting the human administrator, e.g., the TDC, to seek alternative verification measures, for example, verifying the immigration status of the traveler, verifying the traveler's social security number, etc. Process 404 may also seek alternative verification measures by, for example, connecting to databases in real-time to determine whether the issuance process itself was secure.

Computer system 400 may additionally include camera 406 to capture a biometric of the traveler at check point. The biometric may be a facial biometric, a finger print, a iris pattern, a retina pattern, etc. In some implementations, camera 406 may capture a digital picture of traveler at check point. Processor 404 may remove background from the digital picture taken at the scene of the check point and generate the traveler's facial biometric at the time of check-in. Processor 404 may then compare the captured facial biometric with the biometric data obtained, for example, from identification document itself or the issuing authority of the identification document. The comparison may yield a similarity score. Depending on the security alert level at the time, if the similarity score meets a threshold requirement, then the processor may determine that the traveler is the same person as portrayed in the identification document. The threshold may be judicially chosen to reduce the incidents of false positives and/or false negatives, depending on the contexts.

Computer system 400 may also include display 408. Display 408 may be any type of display device capable of showing a scanned biometric and/or text instructions to the human administrator, e.g., the TDC. Example display devices may include, but are not limited to a CRT (cathode ray tube) monitor, a LCD (liquid crystal display) monitor, an LED (light-emitting diode) or OLED (organic light-emitting diode) monitors, a LCOS (liquid crystal on silicon) monitor, any protection display, any touch-sensitive display, etc.

Various implementations of systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube), LCD (liquid crystal display) monitor, LED (light-emitting diode) or OLED (organic light-emitting diode) monitors) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A machine-assisted method for screening a person, the method comprising:
    receiving, at a scanning device, an identification document presented by the person, the identification document showing (i) a machine-readable code that encodes personally identifiable information of the person, (ii) a biometric of the person, and (iii) printed information;
    scanning the machine-readable code on the identification document to extract personally identifiable information of the person; and
    in response to receiving determination results that the extracted personally identifiable information does not match a record stored at a database, providing an indication to select the person for manual screening during which the identification document is manually inspected, while in response to receiving determination results that the extracted personally identifiable information matches a record stored at the database, expediting screening of the person such that whether to admit the person is determined faster than manual inspection by:
        automatically accessing data encoding the biometric of the person on the identification document for comparison with the person presenting the identification document;
        in response to receiving a determination that the biometric on the identification document identifies the person presenting the identification document, automatically determining whether the identification document is digitally watermarked to carry payload data; and in response to determining that the identification document is digitally watermarked, automatically retrieving the payload data from the digitally watermarked identification document.

2. The method of claim 1, further comprising:
determining a first correlation level between the retrieved payload data and the extracted personally identifiable information.

3. The method of claim 2, further comprising:
determining that the first correlation level has reached a first threshold level; and
confirming, in response to determining that the first correlation level has reached a first threshold level, whether the identification document was issued in compliance with a federally mandated issuance process.

4. The method of claim 3, further comprising:
scanning the identification document to obtain the printed information based on an optical character recognition process; and
determining a second correlation level between the printed information obtained from the identification document and the extracted personally identifiable information.

5. The method of claim 4, further comprising:
determining that the second correlation level has reached a second threshold level prior to confirming whether the identification document was issued in compliance with a federally mandated issuance process.

6. The method of claim 3, further comprising:
receiving a confirmation that the identification document was issued in compliance with the federally mandated issuance process; and
sending, based on the received confirmation that the identification document was issued in compliance with the federally mandated issuance process, instructions to an administrator to expedite the screening of the person.

7. The method of claim 3, further comprising:
receiving a confirmation that the identification card was not issued in compliance with the federally mandated issuance process; and
sending, based on the confirmation that the identification document was not issued in compliance with the federally mandated issuance process, instructions to verify an immigration status of the person.

8. The method of claim 3, further comprising:
receiving a confirmation that the identification card was not issued in compliance with the federally mandated issuance process; and
sending, based on the confirmation that the identification document was not issued in compliance with the federally mandated issuance process, instructions to verify a social security number of the person.

9. The method of claim 2, wherein receiving an identification document comprises receiving a driver's license of the person.

10. The method of claim 2, wherein receiving an identification document comprises
receiving a passport of the person.

11. The method of claim 1, further comprising:
receiving, at the scanning device, a biometric of the person presenting the identification document, the biometric taken from the person when the identification document is being presented; and
automatically comparing the biometric on the identification document being accessed with the biometric of the person taken from the person when the identification document is being presented.

12. A computer system for screening a person, the computer system comprising:
a scanner configured to:
receive an identification document presented by the person, the identification document showing (i) a machine-readable code encoding personally identifiable information of the person, (ii) a biometric of the person, and (iii) printed information;
scan the machine-readable code on the identification document to extract personally identifiable information of the person; and
access data encoding the biometric of the person on the identification document for comparison with the person presenting the identification document; and
at least one processor coupled to the scanner and configured to:
in response to receiving determination results that the extracted personally identifiable information does not match a record stored at a database, provide an indication to select the person for manual screening during which the identification document is manually inspected, while in response to receiving determination results that the extracted personally identifiable information matches a record stored at the database, expedite screening of the person such that whether to admit the person is determined faster than manual inspection by:
automatically accessing data encoding the biometric of the person on the identification document for comparison with the person presenting the identification document;
in response to receiving a determination that the biometric on the identification document identifies the person presenting the identification document, automatically determining whether the identification document is digitally watermarked to carry payload data; and
in response to determining that the identification document is digitally watermarked, automatically retrieving the payload data from the digitally watermarked identification document.

13. The computer system of claim 12, wherein the at least one processor is further configured to:
determine a first correlation level between the retrieved payload data and the extracted personally identifiable information.

14. The computer system of claim 13, wherein the at least one processor is further configured to expedite screening of the person by:
determining that the first correlation level has reached a first threshold level; and
confirming, in response to determining that the first correlation level has reached a first threshold level, whether the identification document was issued in compliance with a federally mandated issuance process.

15. The computer system of claim 14, wherein the scanner is further configured to:
scan the identification document to obtain the printed information based on an optical character recognition process.

16. The computer system of claim 15, wherein the at least one processor is further configured to:
   determine a second correlation level between the scanned printed information and the extracted personally identifiable information.

17. The computer system of claim 16, wherein the at least one processor is further configured to:
   determine that the second correlation level has reached a second threshold level prior to confirming whether the identification document was issued through a process in compliance with a federally mandated issuance process.

18. The computer system of claim 14, further comprising:
   a display in communication with the at least one processor and configured to display information to an administrator in charge of screening the person; wherein the at least one processor is further configured to:
      receive a confirmation that the identification document was issued in compliance with the federally mandated issuance process; and
      send instructions to the display for the administer to direct the person for expedited screening.

19. The computer system of claim 14, further comprising:
   a display in communication with the at least one processor and configured to display information to an administrator in charge of screening the person; wherein the at least one processor is further configured to:
      receive a confirmation that the identification document was not issued in compliance with the federal mandate; and
      send instructions to the display for the administer to verify a social security number of the person.

20. The computer system of claim 13, wherein the scanner is further configured to receive a driver's license of the person.

21. The computer system of claim 13, wherein the scanner is further configured to receive a passport of the person.

22. The computer system of claim 13, wherein the computer system further comprises a camera to capture a photo image of the person presenting the identification document, wherein the camera is in communication with the at least one processor, and wherein the biometric is a facial biometric.

23. The computer system of claim 22, wherein the at least one processor is further configured to compare the scanned biometric from the identification document with the captured photo image of the person.

24. The computer system of claim 22, wherein the scanner further comprises:
   a platen on which to place the identification document presented by the person; and
   at least one scanning camera adapted to simultaneously scan the machine-readable code and the biometric from the identification document placed on the platen.

25. The computer system of claim 24, wherein the at least one scanning camera is further configured to scan the printed information from the identification document.

26. A system for triaging a person, comprising at least one processor configured to:
   receive personally identifiable information of the person extracted by scanning a machine-readable code from an identification document presented by the person;
   in response to receiving determination results that the extracted personal identifiable information matches a record stored at a database, expedite screening of the person such whether to admit the person is determined faster than manual inspection by:
      automatically accessing data encoding the biometric of the person on the identification document for comparison with the person presenting the identification document;
      in response to receiving a determination that the biometric on the identification document identifies the person presenting the identification document, automatically determining whether the identification document is digitally watermarked to carry payload data; and
      in response to determining that the identification document is digitally watermarked, automatically retrieving the payload data from the digitally watermarked identification document.

27. A non-transitory computer-readable medium comprising software instructions that when executed by one or more processors, cause the one or more processors to perform the operations of:
   receiving, at a scanning device, an identification document presented by the person, the identification document showing (i) a machine-readable code that encodes personally identifiable information of the person, (ii) a biometric of the person, and (iii) printed information;
   scanning the machine-readable code on the identification document to extract personally identifiable information of the person; and
   in response to receiving determination results that the extracted personal identifiable information matches a record stored at a database, expediting screening of the person such that whether to admit the person is determined faster than manual inspection by:
      automatically accessing data encoding the biometric of the person on the identification document for comparison with the person presenting the identification document;
      in response to receiving a determination that the biometric on the identification document identifies the person presenting the identification document, automatically determining whether the identification document is digitally watermarked to carry payload data; and
      in response to determining that the identification document is digitally watermarked, automatically retrieving the payload data from the digitally watermarked identification document.

* * * * *